(12) United States Patent
Kurtz et al.

(10) Patent No.: US 6,914,979 B2
(45) Date of Patent: Jul. 5, 2005

(54) TONE DETECTION

(75) Inventors: Scott David Kurtz, Burlington, NJ (US); Brian Michael McCarthy, Sr., Montgomery, PA (US)

(73) Assignee: Adaptive Digital Technologies, Inc., Conshoken, PA (US)

( * ) Notice: Subject to any disclaimer, the term of this patent is extended or adjusted under 35 U.S.C. 154(b) by 860 days.

(21) Appl. No.: 09/841,938

(22) Filed: Apr. 25, 2001

(65) Prior Publication Data

US 2003/0012358 A1 Jan. 16, 2003

(51) Int. Cl.$^7$ .................................................. H04M 1/00
(52) U.S. Cl. ...................................... 379/386; 379/372
(58) Field of Search ............................. 379/386, 372, 379/339

(56) References Cited

U.S. PATENT DOCUMENTS

| | | | |
|---|---|---|---|
| 5,588,053 A | 12/1996 | Xie | |
| 5,644,634 A | 7/1997 | Xie | |
| 5,809,133 A | 9/1998 | Bartkowiak | |
| 6,782,095 B1 * | 8/2004 | Leong et al. | 379/386 |

* cited by examiner

Primary Examiner—Forester W. Isen
Assistant Examiner—Jefferey F. Harold
(74) Attorney, Agent, or Firm—Howard R. Popper

(57) ABSTRACT

A DFT is used to compute the magnitude and phase of the frequencies desired to be detected in a frame of sampled data by performing 2 dot products for each such frequency. The two dot products are calculated using the samples in the frame and an equal number of equally spaced cosine and sine coefficients for each frequency to be detected.

2 Claims, 3 Drawing Sheets

TONE DETECTION

FIELD OF THE INVENTION

This invention relates to detecting the tones used for signaling over the public switched telephone network (PSTN).

BACKGROUND OF THE INVENTION

Two types of tone signals are used for signaling in the PSTN. From a subscriber's premises to the central office, DTMF signaling employs two sinusoidal signals, one from a low frequency set of four "row" tones and one from a higher frequency set of four "column" tones to transmit any of the 10 digital values, the symbols "star" and "pound", or the additional symbols "A", "B", "C", and "D". For example, the digit "5" is represented by tones having frequencies of 770 Hz and 1336 Hz. The frequencies used are not spaced at equal increments but rather are deliberately designed to be uncorrelated, i.e., the frequencies are not exact multiples of a common base frequency. A different set of tones spaced at equal intervals of 200 Hz is used by the telephone company for MF signaling among central offices. All possible combinations of two frequencies are used resulting in a 15 distinct tone pairs and unlike DTMF, there are no "row" or "column" associations.

In either situation, the accurate identification of the tones that are present is a process that may have to be carried out under less than ideal conditions. For example, undesired impulse and/or Gaussian noise, induction from power lines as well as components of dial tone, speech and echoes of the tone signals may be present in the telephone loop and should not be mistaken for DTMF signals. In addition, both the accuracy of the generated frequencies as well as their relative amplitudes may vary and the tone signals themselves can be distorted by loss, and non-linear distortion. Various standards have been promulgated such as Telcordia Generic Requirement GR506 Core—Chapter 15 and CCITT recommendations Q.23 and Q.24 in the "Red Book", Volume VI that detail the bounds of acceptable DTMF signals While GR506 Chapter 16 and ITU Q.455 cover MF tone detection. These standards involve various criteria, such as frequency distortion allowance, twist allowance, noise immunity, guard time, talk-down, talk-off, acceptable signal to noise ratio, and dynamic range, etc. A DTMF detector is required to detect a transmitted signal that has a frequency distortion of less than 1.5% and should not detect any DTMF signals that have frequency distortion of more than 3.5%. The term "twist" refers to the difference, in decibels, between the amplitude of the strongest key pad column tone and the amplitude of the strongest key pad row tone. For example, the AT&T standard requires the twist to be between −8 and +4 decibels. Different noise immunity criteria require that signals must meet a specified signal to noise ratio (SNR) which may range from 12 to 24 decibels. A guard time check criteria requires that tones having a duration greater than 40 milliseconds be detected but those having a duration less than 20 milliseconds not be. Speech immunity refers to the ability of the DTMF detector to accurately distinguish DTMF tone signals from actual speech.

The discrete Fourier transform (DFT) running in a digital signal processor can be useful for detecting the frequency components of waveforms such as tone signals. For example, U.S. Pat. Nos. 5,588,053 and 5,644,634 issued to Xie use the DFT to determine the energy level of the different frequencies present in waveforms being analyzed for the presence of DTMF tone signals. The energy levels of the frequency components are compared with predetermined thresholds to determine whether the tones that are present comply with a preset standard. Because the frequencies employed in DTMF signaling are not exact multiples of a common base frequency, using a fixed number of waveform samples in the DFT to detect any of the DTMF tones that may be present will cause the signal energy of a tone to be distributed across the spectrum possibly leading to an error in tone detection. The Xie patent teaches that the DFT can avoid the energy distribution problem by using different frame lengths of from 168 to 178 samples depending on the frequency being looked for in the sampled waveform. It would be extremely advantageous to be able to use a single frame size having a reasonable number of samples and still obtain detection of the tone pairs within the limits of accuracy required by any of the aforementioned standards.

SUMMARY OF THE INVENTION

In accordance with the principles of the invention, as exemplified by the illustrative embodiment, a fixed frame containing N samples of data is used. A DFT forms sine and cosine dot products of the data samples in the frame with frequencies that approximate each of the tones of the set desired to be detected (e.g., eight DTMF frequencies). Instead of multiplying by the exact tones of the set, the closest multiple of a base frequency determined by the quotient of the sampling frequency (typically 8000 Hz) and twice the number of samples Fs/2N is used. A nominal or "expected" phase change occurs between successive frames caused by the difference between a tone frequency of the set and the integer multiple of the base frequency used in forming the dot products. The power of a detected tone is determined by the sum of the squares of the in-phase and quadrature dot products ($I^2+Q^2$). The arctan (Q/I) is computed for the two highest power tones on successive frames, and the phase difference between successive frames is computed. From the computed phase differences the "expected" phase change is subtracted, to calculate the frequency deviation of the tone. The expected phase change is mapped into the range of −PI to PI by taking the expected phase modulo 2*PI. If the deviations exceeds the aforementioned specifications, the detection is declared to be invalid.

Computation of the arctan function for phase measurement is advantageously performed using fixed point arithmetic available in a digital signal processor. For each of the two frequencies of greatest power, the arctan (Q,I) function returns a four quadrant result between −PI and PI in order to be able to find actual phase differences. Phase is arctan(Q,I). Previous phase is the phase computed in the previous frame, which is used to compare with the current phase to determine the change over the interval of a single frame.

DeltaPhase=Phase−Previous Phase

PhaseDeviation=abs(DeltaPhase−ExpectedDeltaPhase);
These subtract operations are done modulo 2*PI and the results are forced to lie within −PI and PI by subtracting 2*Pi from any phase value greater than PI and adding 2*Pi to any phase value <−PI.

Further in accordance with the invention, the amplitude of an observed tone is adjusted for the sin(x)/(x) roll off of the response according to the deviation (x) of the observed tone from the appropriate tone of the set. The nulls in the magnitude response occur at the center frequencies of the other bins in the frequency set of the DFT. The deviation "x" is used to compute a (x)/sin d(x) multiplicative adjustment to the computed power. With the results of the aforementioned operations, decision functions are executed to determine whether the tones detected are valid with respect to power, signal to noise ratio, twist, stability throughout the requisite intervals.

BRIEF DESCRIPTION OF THE DRAWING

The foregoing and other objects and features of the invention may become clearer from a reading of the ensuing detailed description together with the drawing in which.

GENERAL DESCRIPTION

The discrete Fourier transform is a technique that involves the sampling of a waveform and summing the products of the samples with a succession of different complex sinusoids. The shorter the time interval between samples and the greater the total number of samples the more accurate the analysis. For a length N complex sequence x(n), n=0, 1, 2, ..., N−1, the discrete Fourier transform (DFT) is defined by:

$$X(\omega_k) \triangleq \sum_{n=0}^{N-1} x(n)e^{-j\omega_k t_n} = \sum_{n=0}^{N-1} x(n)e^{-j2\pi k \frac{n}{N}}, k = 0, 1, 2, \ldots N-1$$

where: $t_n$=nT, the nth sampling instant (sec), where T is the time interval between samples of the waveform;

$\omega_k$=kΩ, kth frequency sample (rad/sec), where Ω is the frequency interval between frequency samples used in the summation;

T=1/$f_s$, the time sampling interval (sec); and

Ω=2π $f_s$/N, the frequency sampling interval (sec).

The transform kernel, $e^{-j\omega_k t_n}$=cos($\omega_k t_n$)−j sin($\omega_k t_n$), consists of samples of a complex sinusoid at N discrete frequencies $\omega_k$, uniformly spaced between 0 and the sampling rate $\omega_s$=2π$f_s$. Because the DFT uses evenly spaced frequency samples, i.e., integer multiples of a common base frequency, a problem can arise when the waveform being sampled contains frequencies that are not integer multiples of the base frequency used in the DFT.

In the telephone industry the waveform sampling frequency $f_s$ is usually fixed at 8000 per second which limits the detection of the constituent frequencies in the waveform to those of 4 KHz and below. Since the sampling rate is fixed, the remaining transform parameters to be selected for use are the number of waveform samples N to put in the "frame" and the succession of k frequencies $\omega_k$ to be used in forming the N dot products with the samples of x(n). Once N and $f_s$ have been chosen, the interval between frequency samples, Ω=2π $f_s$/N, is determined.

In the prior art some attention has been paid to the situation where the frequencies being looked for are not integer multiples of a common base frequency $\omega_k$. U.S. Pat. No. 5,644,634 attempts to deal with the problem by using a number of samples N, i.e., a "frame" length that depends on the frequency being looked for. In accordance with the present invention, however, it is not necessary to use different length frames. Instead, it has been appreciated that while the use of a common frame for all samples of the waveform may lead to "errors", the errors are predictably of the form sin x/x and can be compensated for.

Figure 1:
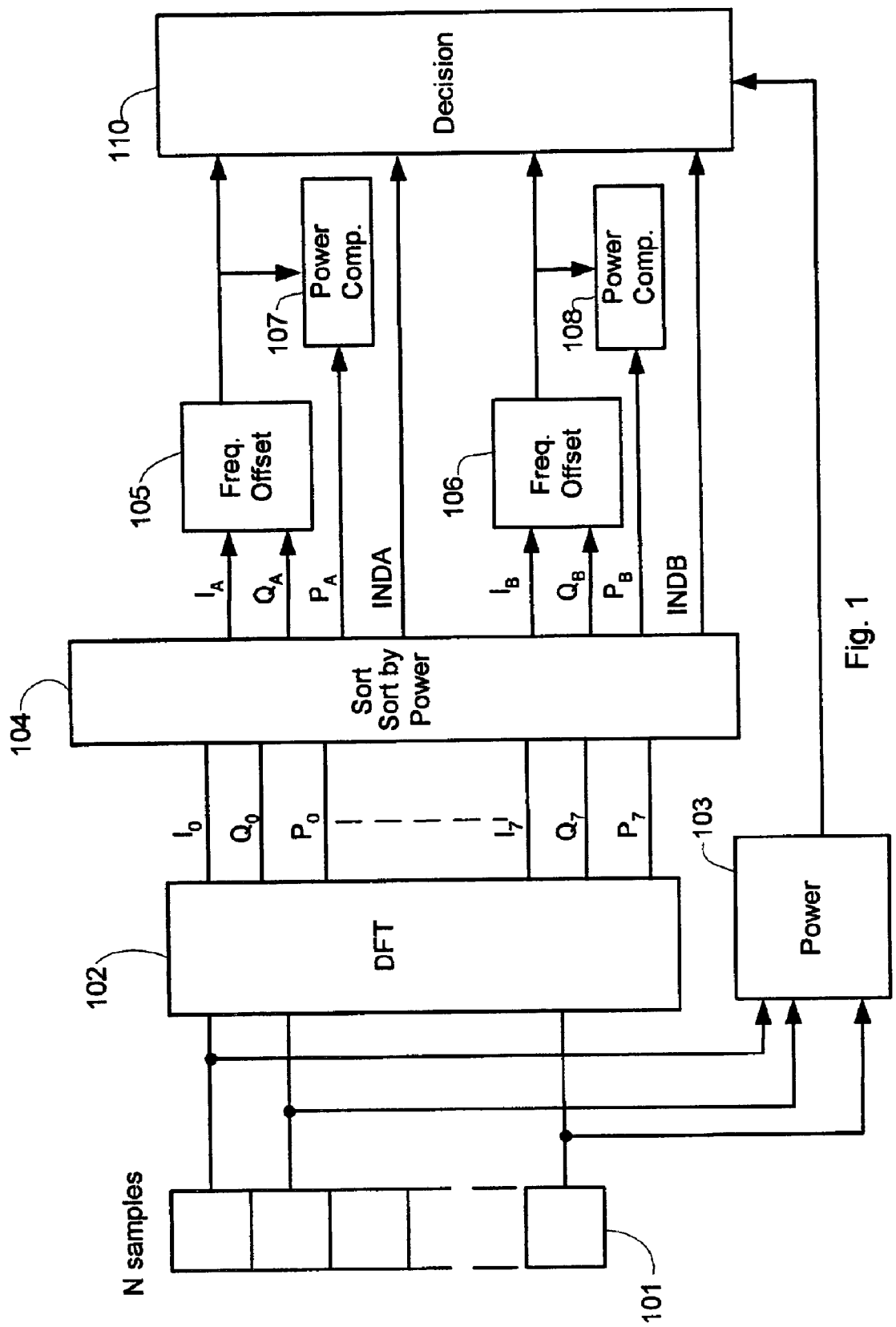
FIG. 1 is a block diagram of the frequency detection process.

Referring to FIG. 1, the input to the DTMF detector is, illustratively, a sequence of 16-bit linearly quantized samples that are referenced to a sinusoidal signal whose peak to peak amplitude spans the entire dynamic range of the 16 bit numbers corresponding to a signal power of 3 dBm. The input is fed into a framer 101, which collects N=105 samples for further processing. A frame of 105 samples is fed to DFT 102 which computes the in-phase components 10 to 17; the quadrature components Q0 to Q7 and power P0 to P7 at each of the 8 DTMF frequencies. The first few dot product multiplications of the sampled waveform by complex sinusoids is illustrated by the following lines of pseudo code. The Input Samples are in array InputSamples[105]. The sine and cosines are stored in tables DFT Cos [8][105] and DFT Sin [8][105]:

```
for (Freq = 0; Freq < 8; Freq++)
{
    InPhase[Freq] = 0;
    Quadrature[Freq] = 0;
    for (i = 0; i < 105; i++)
    {
        InPhase[Freq] += InputSamples[i] *
DFTCos[Freq][i];
        Quadrature[Freq] += InputSamples[i] *
DFTSin[Freq][i];
    }
    Power[Freq] = sqr(InPhase[Freq]) +
sqr(Quadrature[Freq]);
}
```

DFT 102 is need not be a complete DFT since it is necessary to only compute outputs at 8 of the 105 possible frequency bins. The input is also fed to Power computation block 103 which computes the short term power over the 105 sample window. It should be appreciated that for MF detection only 6 MF frequencies are involved rather than 8 for DTMF.

The DFT outputs (I, Q, and P) are fed into sort function 104 which sorts the 8 tones in order of descending power and outputs the IA, IB, QA, QB and PA, PB values for the two highest power tones and the value of the third highest power tone PC. The I and Q values associated with the two highest power tones are fed into a frequency offset computation functions 105, 106 which determine the frequency deviation from the nominal frequency. The deviations PDA, PDB are computed by comparing the current phase with the phase of the previous frame, forming the phase change (Delta Phase). The expected or nominal phase change for the tone in question is subtracted from the computed phase change, resulting in the phase change deviation (PD), which is a measure of frequency deviation:

P=atan2(Q, I)

Delta Phase=PP−P (where PP=Previous Phase)

PD=Delta Phase−Nominal Delta Phase.

atan2 is a function that computes the arctangent using both the I and Q components in order to compute the angle within the full unit circle (−PI . . . PI).

The frequency deviation (PD) is fed into a power compensation block, which is used to adjust the computed power for the sin(x)/x characteristic of the DFT operation, where x is a measure of deviation from the nominal frequency.

An example is in order. At our sampling frequency of 8000 Hz and frame size of 105 samples, the frequency bins are spaced at approximately 38 Hz. For example, the second bin, which is centered at 76 Hz, bin spans 76+/−38/2 Hz or 57 Hz through 95 Hz. If the input frequency is 76 Hz, the deviation will be zero. If the input frequency is either 57 or 95 Hz, the deviation will be PI. (Recall that we took the absolute value to form the deviation.) At frequencies in between, the deviation is proportional to the frequency deviation Deviation=Frequency Deviation * PI/38

That having been said, we use this deviation to compensate the DFT output power for the Sin(x)/x rolloff of amplitude that is characteristic of the DFT within each of its frequency bins. Using our previous example, the "gain" characteristics of the DFT are as follows:

G=sin(Deviation/2)/(Deviation/2) where Deviation is in radians. In order to compensate for this rolloff, we must multiply the resulting DFT amplitude by the inverse of this gain. The correction factor for the amplitude as a function of deviation is therefore:

Correction=(Deviation/2)/sin(Deviation/2)

The power correction is the square of this number.

After computing the phase deviation DPhase, the adjustment is illustrated by the following lines of pseudo code:

Correction=Compute SinXOverXCorrection(DPhase, Frequency);
Power[Freq]=Correction * Power[Freq];

where Compute SinXOverXCorrection( ) is a function that computes the multiplicative correction of x/Sin(x) based upon the frequency deviation, which is represented by DPhase. Since the translation between DPhase and the frequency deviation is a function of the center frequency in question, the Frequency is fed to the Compute SinXOverX-Correction function. What we are left with is a number of statistics feeding a Decision function shown in FIG. 2.

Figure 2:
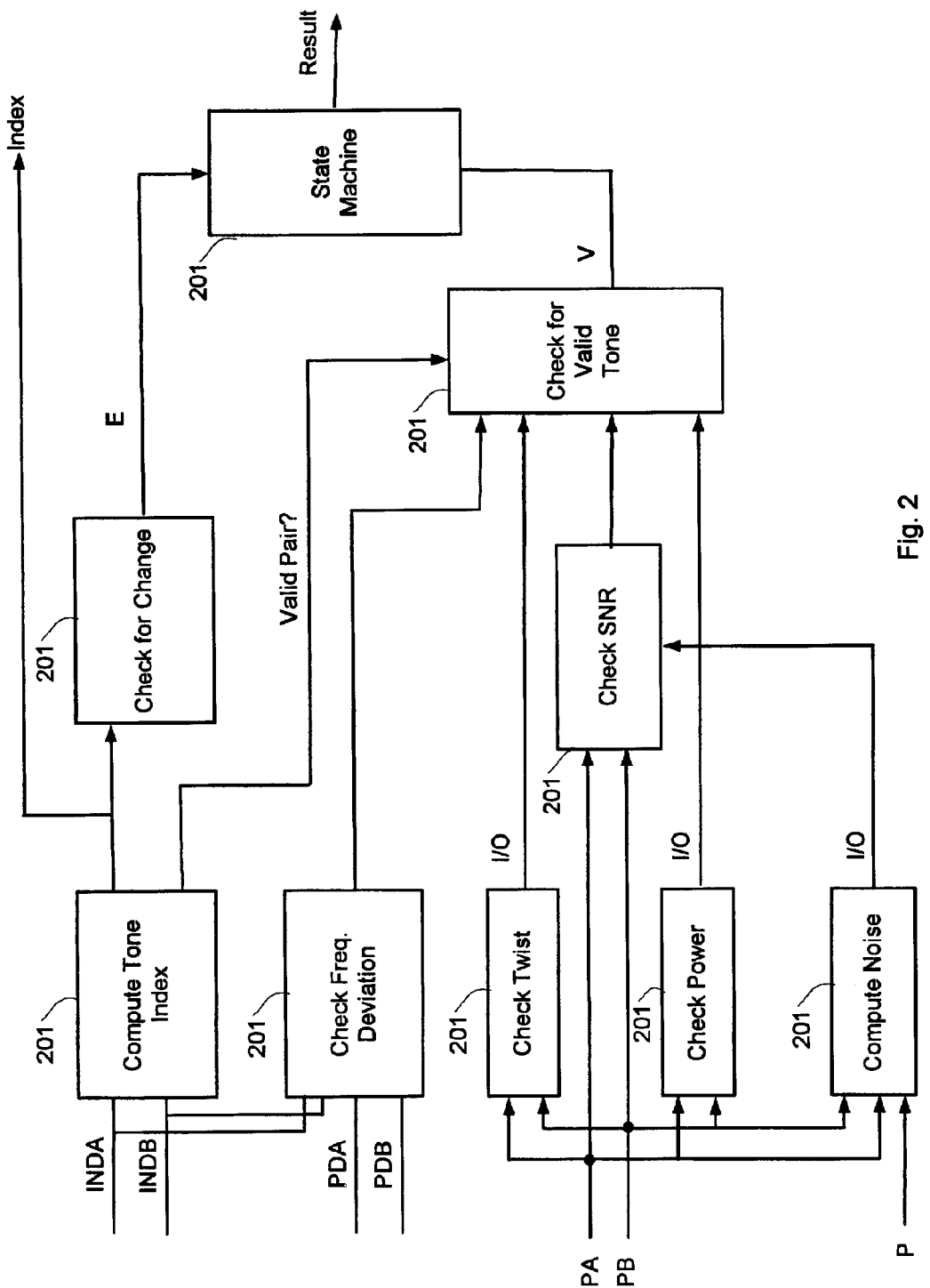
FIG. 2 is a block diagram of the decision function which determines whether a detected frequency meets defined criteria.
Figure 3:
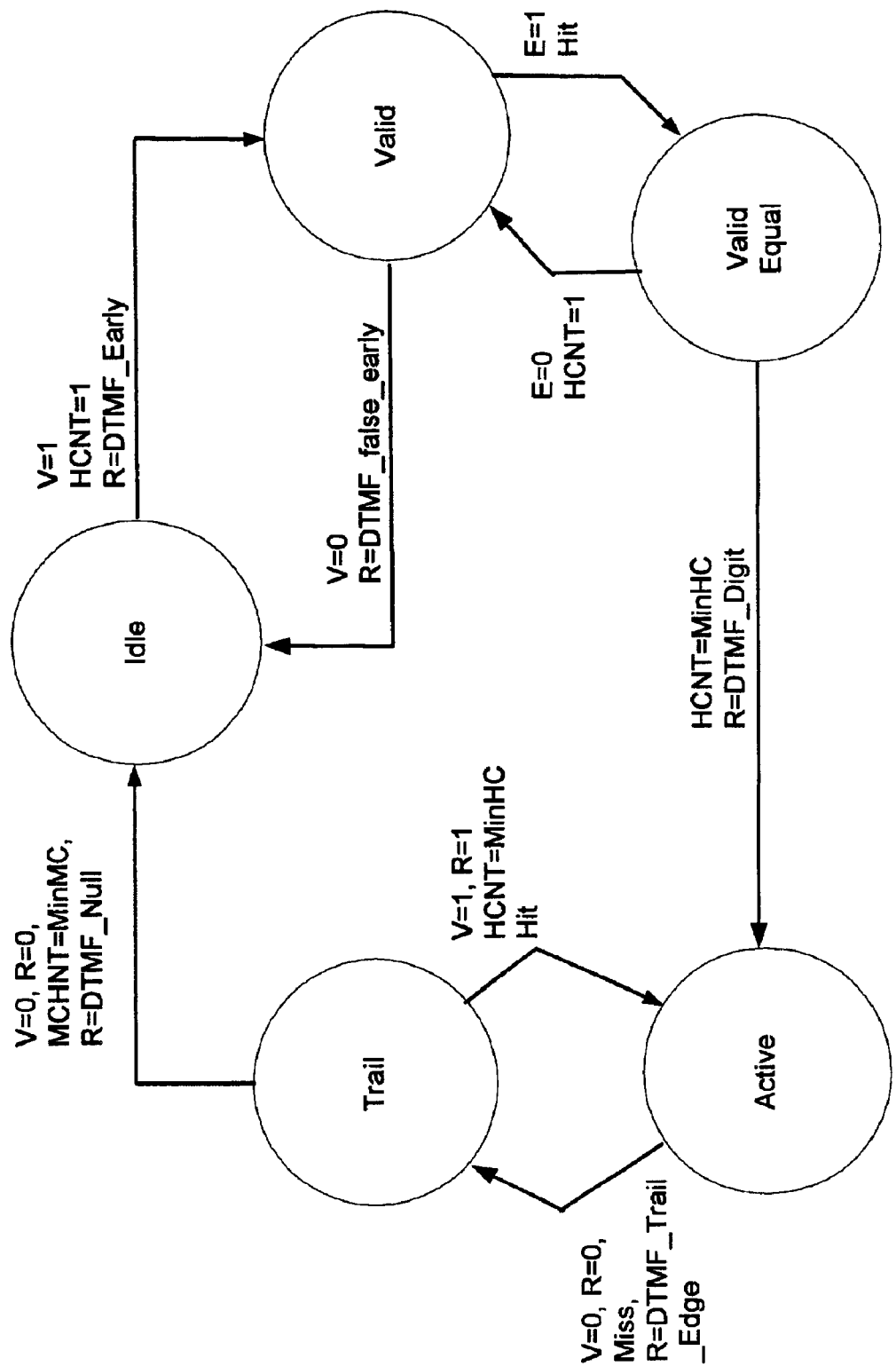
FIG. 3 is the decision function state machine.

The decision process of FIG. 2 comprises a number of validity checks. For DTMF detection, the first validity check verifies that one of the selected frequencies is one of the four lower DTMF frequencies and that the other selected frequency is one of the higher DTMF frequencies. (Of course, for MF detection there are not two different frequency bands to be verified). The second validity check verifies that the frequency deviation of each of the two selected frequencies is within tolerance. The third validity check verifies that the twist is within tolerance. The fourth validity check verifies that each of the two tones' powers exceeds the minimum requirement. The final validity check verifies that the signal to noise ratio (SNR) exceeds the minimum requirement. The "Valid" (V) flag is the logical AND of all the aforementioned validity checks. An additional check is done to verify that the DTMF tone pair that was detected in the current frame is the same as that detected in the previous frame. The result of this check is the Equal (E) flag. The Valid and Equal flags are inputs into the state machine, FIG. 3, which uses this information in conjunction with the past state to make a final decision. The state machine ensures that the tone is present for the minimum duration. It also performs debouncing. The abbreviations used in FIG. 3 are as follows:

V: Tone Pair Validity Check Passed
E: Current tone index=previous tone index
R: DTMF Detector Result Code
HCNT: Hit Count
MCNT: Miss Count
MINHC: Minimum hit count
MINMC: Minimum miss count
HIT: Increment hit counter with MINHC as the maximum value. Set miss counter=0
MISS: Increment miss counter, with MINMC as the maximum. Set hit counter=0.

The state machine has 5 states, represented by the circles in the diagram. The states are defined as follows:

IDLE—No DTMF activity has been detected recently
VALID—The validity checks have passed
VALID,EQUAL—The validity checks have passed and the tone detected in the current window is equal to the tone that was detected in the previous window
ACTIVE—A valid DTMF digit has been detected and it is still active
TRAIL—The DTMF digit is trailing off.

With respect to the state machine VALID refers to the situation where all the validity checks pass in the current frame. When the hit count reaches MINHC, the active state is declared which indicates that a tone has been detected. (This is shown as R=DTMF_DIGIT). The state machine remains in the active state until the tone starts to trail off. The following result codes exist: DTMF_EARLY indicates that the beginning of a DTMF tone might be present; DTMF_DIGIT indicates that a tone has been detected and is still being detected; DTMF_TRAIL_EDGE indicates that the tone is trailing off; DTMF_IDLE is the idle state; DTMF_FALSE_EARLY indicates that false detection of the start of a tone. The tone index (0.15 for DTMF) corresponding to the Row, Column pair. The tone index is only valid if the two highest amplitude tones are a row and column (DTMF only). The Previous Tone Index is the Tone index from the previous frame. Thus, if the Tone Index (for DTMF detection) for the current frame differs from the Tone Index of the previous frame, valid tone cannot be declared. This is an extra check to reduce the probability of false detection; i.e., the DTMF tone has been valid and unchanged for the minimum pulse duration. A hit is defined as an occurrence of a valid DTMF tone in the current frame. The hit counter, HCNT is incremented each time a hit occurs, but HCNT will not be incremented above MINHC. MINHC is actually the threshold for declaring a valid DTMF digit detection. The terminology refers to the minimum number of hits required to detect a DTMF digit. A miss is defined as the lack of detection of a valid DTMF tone in the current frame. The miss counter, MCNT is incremented each time a miss occurs, but MCNT will not be incremented above MINMC. MINMC is actually the threshold for declaring a DTMF digit has ended. The terminology refers to the minimum number of misses required to declare that a DTMF digit has ended. The state machine is updated once per DFT window or frame. A state transition is indicated by an arrow that starts at the current state and points to the next state. The state transition is labeled with text containing the event that triggers the transition and the action that takes place as a result.

The following pseudo-code describes the program flow of the DTMF detector software:

DTMFDetect
While there are more samples to process:
Process samples using DFT function. (This function includes updating the total power)
If processing of DFT window is complete
Perform Post-DFT processing (DumpChannel( ))
DumpChannel (Performs Post-DFT processing)
Compute DFT bin powers
Sort DFT frequencies in descending order of power, retaining the 3 highest power
Compute the tone index based upon 2 highest power frequencies
Compute phase associated with 2 frequencies Compute phase changes with respect to previous DFT window
Verify minimum power requirements
Verify that frequency offset is within specified requirements
Correct powers for sin(x)/x based upon frequency deviation
Subtract the two corrected powers from the total power to form the noise power
Verify minimum power requirements based upon corrected powers
Verify that SNR and twist requirements are met
Verify that second highest power frequency sufficiently exceeds third highest power
The Valid flag is set as the logical and of the aforementioned verifications
Set the Equal flag if the current tone index is equal to the previous tone index
Implement the DTMF Detector state machine.
Update previous tone index, clear noise power.
Return result.

Fixed Point Radian Scale is introduced as a way to express radian frequency using fixed point numbers. A fixed point radian number varies between −16384 and 16384 as the radian varies between −PI and +PI. The conversion is therefore Fixed Point Radian=16384/PI*Radian The Arc Tangent function is a transcendental function and is hence defined as a summation of an infinite set of rational numbers. It is not practical to perform such an operation in real-time on a DSP. There are methods that can be used to approximate the arc tangent function with reasonable precision with a finite number of multiply, add, and divide operations. Unfortunately, these methods are best implemented using floating point arithmetic due to dynamic range issues, making these methods less than desirable on a fixed point DSP running a real-time application.

The DTMF detector requires little precision from the arc tangent function because the specifications for frequency offset are loose enough that some error in the calculations can be tolerated. Therefore, the arc tangent of the quotient of the quadrature and in-phase components can be approximated by the quotient itself for small absolute values of the quotient. Thus, the approximation can be made that for −PI/4<=x<=PI/4, arc tan(x)=x. Given a set of rectangular coordinates I and Q (or adjacent and opposite), the corresponding angle in polar form is computed as A tan2(Q, I). Our approximation only accounts for −PI/4<=Q/I<=PI/4, which is a mere quarter of the unit circle. As a result, we first take the approximate arctangent of abs(Q/I). This gives us an angle Theta1 between 0 and PI/4.

AI=abs(I)
AQ=abs(Q)
Theta1=AQ/AI //Approximation

Next, we make use of three pieces of information to compute the actual corresponding angle Theta within the range −PI . . . PI:
Sign of I
Sign of Q
Determining which of I and Q has greater absolute value
Switch(I, Q, AI, AQ)
I>=0, Q>=0, AI>AQ // 0<=Theta<=PI/4 Theta=Theta1
I>=0, Q>=0, AI<AQ // PI/4<=Theta<=PI/2 Theta=PI/2−Theta1
I<0, Q>=0, AI>AQ // 3/4PI<=Theta<=PI Theta=PI−Theta1
I<0, Q>=0, AI<AQ //PI/2<=Theta<=314PI Theta=PI/2+Theta1
I>=0, Q<0, AI>AQ // −PI/4<=Theta<=0 Theta=−Theta1
I>=0, Q<=, AI<AQ // −PI/2<=Theta<=−PI/4 Theta=−PI/2+Theta
I<0, Q<0, AI>AQ //−PI<Theta<=−3/4PI Theta=−PI+Theta1
I<0, Q<0, AI<AQ //−3/4PI<=Theta<=−PI/2 Theta=−PI/2−Theta1

What has been described is deemed to be illustrative of the principles of the invention. Further and other modifications may be made by those skilled in the art without, however, departing from the spirit and scope of the invention.

What is claimed is:

1. A method for determining whether any of a predetermined set of tones present in a plurality of successive frames of digital samples of a received signal falls within a predetermined frequency tolerance, comprising the steps of:
   obtaining discrete Fourier transform pairs of in-phase and quadrature dot products of said samples and integer multiples of a base frequency, said base frequency being determined by the quotient of the sampling frequency and a multiple of the number of samples in successive ones of said frames;
   computing the quotients of the highest power ones of said products obtained on successive frames;
   using said quotients to approximate an arctangent function for ascertaining the phase of frequencies contained in successive frames;
   computing the phase change for each of said frequencies by subtracting the phase of a previous phase frame from the current frame; and
   subtracting an expected phase change from said computed phase change of said highest power ones of said products to determine the deviation of an observed tone from said predetermined frequency tolerance.

2. A method for determining whether any of a predetermined set of tones present in a plurality of successive frames of digital samples of a received signal falls within a predetermined frequency tolerance, comprising the steps of:
   obtaining discrete Fourier transform pairs of in-phase and quadrature dot products of said samples and integer multiples of base frequency, said base frequency being determined by the quotient of the sampling frequency and a multiple of the number of samples in successive ones of said frames;
   computing an expected phase change between successive frames as the quotient of the quadrature and in-chase products for small absolute values of the quotient;
   approximating an arc tangent function for the phase angle for the highest power ones of said products obtained on successive frames by the quotient of the quadrature and in-phase dot products for small absolute values of the quotient;
   subtracting said expected phase change from the phase angle of said highest power ones of said products to determine the deviation of an observed tone from said predetermined frequency tolerance; said approximation of said arc tangent function theta being performed as follows:
   a. for I>=0, Q>=0, AI>AQ, and 0<=Theta<=π/4, Theta=Theta1;
   b. for I>=0, Q>=0, AI<AQ, and π/4<=Theta<=π/2, Theta=π/2−Theta1;
   c. for I<0, Q>=0, AI>AQ, and 3/4π<=Theta<=π, Theta=π−Theta1;

d. for I<0, Q>=0, AI<AQ, and π/2<=Theta <=3/4π, Theta=π/2+Theta1;
e. for I>=0, Q<0, AI>AQ, and −π/4<=Theta<=0, Theta=−Theta1;
f. for I>=0, Q<=, AI<AQ, and −π/2<=Theta<=−π/4, Theta=−π/2+Theta;
g. for I<0, Q<0, AI>AQ, and −π<Theta<=−3/4π, Theta=−π+Theta1; and
h. for I<0, Q<0, AI<AQ, and −3/4π<=Theta<=−π/2, where I is the in-phase component; Q is the quadrature component; AI is the absolute value of I: AQ is the absolute value of Q; Theta 1 the absolute value of AQ/AI.

* * * * *